United States Patent [19]
Eade

[11] Patent Number: 5,912,683
[45] Date of Patent: Jun. 15, 1999

[54] METHOD OF PRINTING WITH AN INK JET PRINTER USING AN ENHANCED HORIZONTAL RESOLUTION

[75] Inventor: Thomas Jon Eade, Lexington, Ky.

[73] Assignee: Lexmark International, Inc., Lexington, Ky.

[21] Appl. No.: 08/920,181

[22] Filed: Aug. 25, 1997

[51] Int. Cl.$^6$ ................ B41J 2/145; B41J 2/15
[52] U.S. Cl. ................ 347/40; 347/41
[58] Field of Search ................ 347/5, 40, 41, 347/14; 395/107; 358/298

[56] References Cited

U.S. PATENT DOCUMENTS

| | | | |
|---|---|---|---|
| 4,032,978 | 6/1977 | Wong | 358/298 |
| 4,595,948 | 6/1986 | Itoh et al. | 358/502 |
| 4,651,287 | 3/1987 | Tsao | 347/3 |
| 4,667,250 | 5/1987 | Murai | 358/298 |
| 4,809,063 | 2/1989 | Moriguchi et al. | 358/298 |
| 4,829,370 | 5/1989 | Mayne et al. | 358/537 |
| 4,953,015 | 8/1990 | Hayasaki et al. | 358/529 |
| 5,111,302 | 5/1992 | Chan et al. | 358/298 |
| 5,258,832 | 11/1993 | Rylander | 358/527 |
| 5,278,678 | 1/1994 | Harrington | 358/518 |
| 5,327,258 | 7/1994 | Ueda | 358/448 |
| 5,383,036 | 1/1995 | Mailloux et al. | 358/518 |
| 5,446,804 | 8/1995 | Allebach et al. | 382/298 |
| 5,469,198 | 11/1995 | Kadonaga | 347/41 |
| 5,480,240 | 1/1996 | Bolash et al. | 400/124.01 |
| 5,541,625 | 7/1996 | Holstun et al. | 347/5 |

*Primary Examiner*—N. Le
*Assistant Examiner*—Thinh Nguyen
*Attorney, Agent, or Firm*—Ronald K. Aust; John J. McArdle

[57] ABSTRACT

A method of printing an image on a print medium with ink using an ink jet printer. A printhead has a plurality of ink emitting orifices for jetting ink onto the print medium, with the ink emitting orifices being spaced apart in the advance direction a common distance. The printhead is movable in a direction transverse to the advance direction in incremental steps, with the incremental steps having a minimum step distance. An image area has a plurality of rows and columns of pixel locations. The columns of pixel locations have an advance pixel resolution which is dependent upon the common distance. The rows of pixel locations have a transverse pixel resolution which is dependent upon the minimum step distance. A threshold matrix is defined with a plurality of rows and columns of cells, with each cell corresponding to one of the pixel locations in the image area. A threshold value is assigned to each cell within the threshold matrix. A transition matrix is defined having a same number of rows as the threshold matrix and a greater number of columns than the threshold matrix. Each column of the transition matrix has cells with threshold values which correspond to one of the columns of the threshold matrix, and is disposed adjacent to at least one other column with cells of identically assigned threshold values. The ink is jetted onto the print medium, dependent upon the color value of the ink and the threshold values of the transition matrix.

9 Claims, 3 Drawing Sheets

34

| 0 | 12 | 3 | 15 | 0 | 12 | 3 | 15 |
|---|---|---|---|---|---|---|---|
| 8 | 4 | 11 | 7 | 8 | 4 | 11 | 7 |
| 2 | 14 | 1 | 13 | 2 | 14 | 1 | 13 |
| 10 | 6 | 9 | 5 | 10 | 6 | 9 | 5 |

TRANSITION MATRIX
CYAN = 8
MAGENTA = 4
YELLOW = 12

TRANSITION MATRIX
CYAN = 8
MAGENTA = 4
YELLOW = 12
Fig. 3
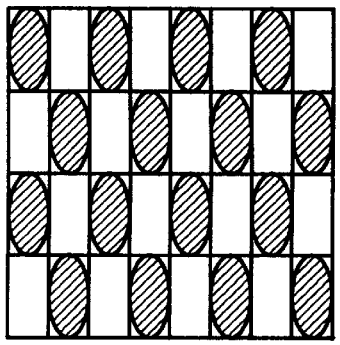
CYAN IMAGE PLANE
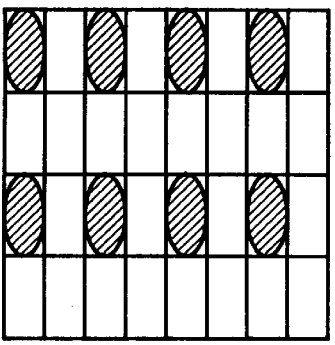
MAGENTA IMAGE PLANE
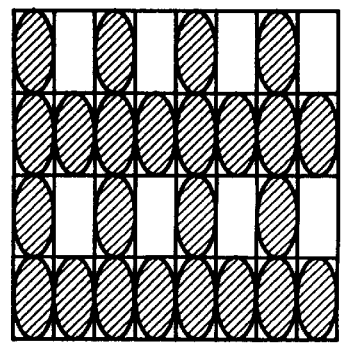
YELLOW IMAGE PLANE
Fig. 4
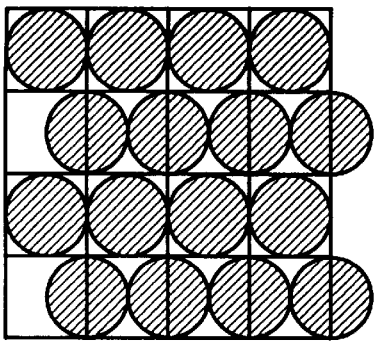
CYAN PRINT PLANE
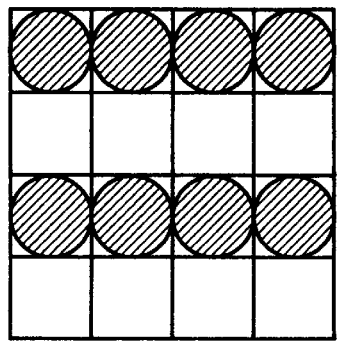
MAGENTA PRINT PLANE
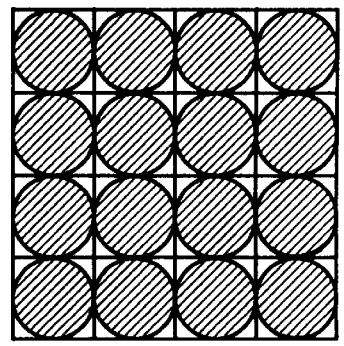
YELLOW PRINT PLANE
Fig. 5

```
0  0 12 12  3  3 15 15
8  8  4  4 11 11  7  7
2  2 14 14  1  1 13 13
10 10 6  6  9  9  5  5
```
38
TRANSITION MATRIX
CYAN = 8
MAGENTA = 4
YELLOW = 12
Fig. 6
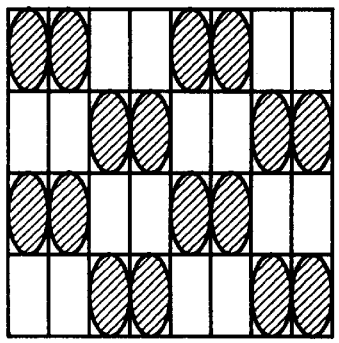 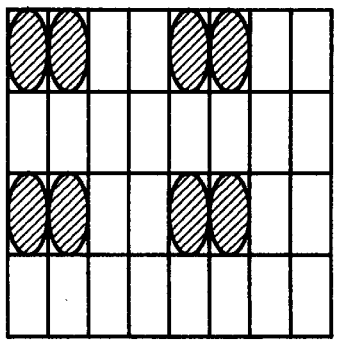 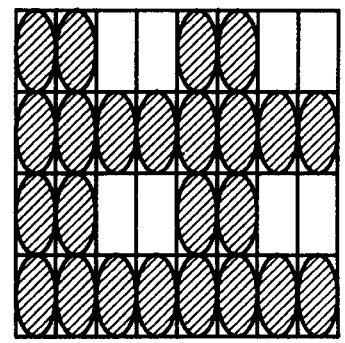
CYAN IMAGE PLANE    MAGENTA IMAGE PLANE    YELLOW IMAGE PLANE
Fig. 7
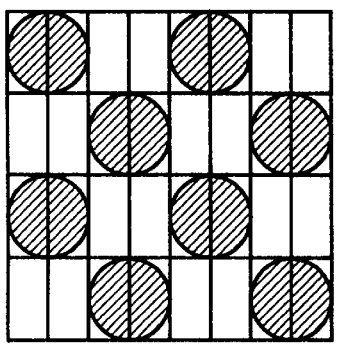 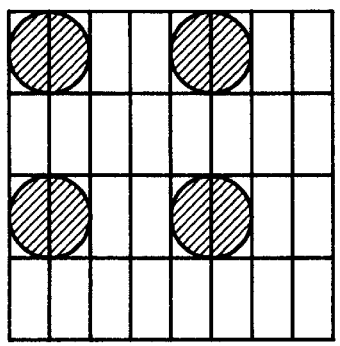 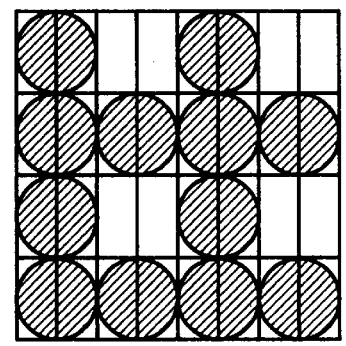
CYAN PRINT PLANE    MAGENTA PRINT PLANE    YELLOW PRINT PLANE
Fig. 8

METHOD OF PRINTING WITH AN INK JET PRINTER USING AN ENHANCED HORIZONTAL RESOLUTION

BACKGROUND OF THE INVENTION

1. Field of the Invention

The present invention relates to ink jet printers, and, more particularly, to a method of printing with an ink jet printer using an enhanced horizontal resolution.

2. Description of the Related Art

An ink jet printer includes a printhead having a plurality of ink emitting orifices therein (FIG. 1). For a multi-color ink jet printer, the ink emitting orifices in the printhead are typically segregated into separate arrays of ink emitting orifices, with each array corresponding to a different color ink to be jetted onto a print medium. A plurality of ink jetting heaters which are associated with respective ink emitting orifices are selectively actuated to jet the ink from the ink emitting orifices, in known manner.

The printhead is typically mounted on and carried by a movable carriage assembly. The print medium is movable in an advance direction within the printer, and the carriage assembly is movable in a transverse or orthogonal direction relative to the advance direction. An image area is defined which overlies the print medium. The image area includes a plurality of rows and columns of pixel locations. Each separate pixel location corresponds to an ink dot placement location on the print medium. The resolution or center-to-center spacing between the pixel locations is typically predefined in both the vertical (i.e., advance) direction and the horizontal (i.e., transverse) direction. The vertical resolution of the pixel locations is defined by the center to-center spacing between the ink emitting orifices. The horizontal resolution of the pixel locations is defined by frequency response limitations associated with the printhead. For example, the ink feed channel and nozzle section associated with each ink emitting orifice require a certain amount of time to refill after the associated ink jetting heater is actuated during printing. The transverse resolution of the pixel locations may be a function of the ink refill time for the orifices in the printhead. A typical printhead used in an ink jet printer places ink dots in an image area on a print medium at an advance resolution of 300 dpi and a transverse resolution of 300 dpi.

Notwithstanding the frequency response limitations of a printhead which may define the actual horizontal resolution of the pixel locations in an image area, the printhead may actually have an addressable resolution in the transverse direction which is greater than the actual resolution of the pixel locations in the transverse direction. More particularly, the carriage assembly which carries the printhead is typically driven by a stepper motor which steps the carriage assembly across the print medium in the transverse directions in incremental steps. The stepper motor has a minimum step distance which corresponds to the addressable resolution of the printhead in the transverse direction. For example, the actual transverse resolution of the printhead may be set at 300 dots per inch (dpi) because of frequency response limitations associated with the printhead, while the addressable resolution of the printhead in the transverse direction may correspond to 600 dpi. With such an example, the addressable resolution of the printhead is actually twice that of the actual transverse resolution of the printhead.

It is known to provide an enhanced print quality in a monochrome (i.e., single color) ink jet printer by taking advantage of the addressable transverse resolution of the printhead. For example, U.S. Pat. No. 5,480,240, assigned to the assignee of the present invention, discloses a method of providing enhanced print quality by enhancing the resolution of the print image along the horizontal axis. Print data which is stored at a lower resolution grid format is shifted to a finer resolution grid format associated with the addressability of the printhead in the horizontal direction. The center of the ink dot placement locations and the size of the ink dots may be varied using the finer resolution grid to provide the enhanced print quality.

Printing with a multi-color ink jet printer typically utilizes a halftoning process to determine the relative frequency of ink dots and their arrangement on the print image to produce colors not in the set of primary colors. A threshold matrix of a predetermined size includes a plurality of rows and columns of cells, with each cell corresponding to a pixel location in the image area. Each cell is assigned a threshold value which is scaled proportionately to normalize the colors to the size of the matrix used. As the print image is analyzed, the position of a cell within the threshold matrix is used to determine the threshold value for that particular cell. Each of the primary colors are assigned a color value. If the color value for the primary color is greater than the threshold value within a cell of the threshold matrix, ink is jetted at a corresponding pixel location in the image area.

Referring to FIG. 2, an example of a threshold matrix for use during a halftoning process during color printing is shown. The threshold matrix includes four columns and four rows, with a total of sixteen cells. Each cell corresponds to one of the pixel locations in the image area and is assigned a threshold value as indicated. The primary color cyan is assigned a color value of 8; magenta is assigned a color value of 4; and yellow is assigned a color value of 12. Cyan ink would thus be printed at pixel locations corresponding to the substantially filled cells indicated by the cyan print plane. It should be noted that the color values assigned to each primary color can generally be thought of as corresponding to a percentage of that particular primary color ink to be jetted onto the print medium within a portion of the image area corresponding to the threshold matrix. That is, for the example shown, the threshold matrix includes sixteen total cells and cyan ink is assigned a color value eight. Thus, approximately eight out of sixteen cells (i.e., approximately 50%) of the cells are assigned a cyan color value. This correspondingly means that approximately 50% of the pixel locations corresponding to the threshold matrix cells likewise receive cyan ink. Likewise, the yellow ink would be placed at approximately 12/16 or 75% of the pixel locations for the threshold matrix on the corresponding portion of the image area. The threshold matrix can thus be thought of as a frequency distribution of the various color ink dots within a predefined and corresponding portion of the image area.

What is needed in the art is a method of providing an enhanced resolution along the horizontal axis with a color ink jet printer, without affecting adversely a halftoning printing technique.

SUMMARY OF THE INVENTION

The present invention provides a method of printing with a multi-color ink jet printer wherein the print resolution in the transverse direction is enhanced by expanding a threshold matrix in the transverse direction such that each column is disposed adjacent to at least one other column with identical threshold values. The threshold matrix is expanded in the transverse direction dependent upon the addressable resolution of the printhead in the transverse direction (e.g., the minimum stepping distance of a stepper motor driving a carriage assembly which carries the printhead).

The invention comprises, in one form thereof, a method of printing an image on a print medium with at least one color ink using an ink jet printer. The print medium is movable in an advance direction in the ink jet printer. The printhead has a plurality of ink emitting orifices for jetting ink onto the print medium, with the ink emitting orifices being spaced apart in the advance direction a common distance. The printhead is movable in a direction transverse to the advance direction in incremental steps, with the incremental steps having a minimum step distance. An image area has a plurality of rows of pixel locations and a plurality of columns of pixel locations, with the pixel locations corresponding to ink dot placement locations on the print medium. The columns of pixel locations have an advance pixel resolution which is dependent upon the common distance. The rows of pixel locations have a transverse pixel resolution which is dependent upon the minimum step distance. A color value is assigned to the at least one color ink. A threshold matrix is defined with a plurality of rows of cells and a plurality of columns of cells, with each cell corresponding to one of the pixel locations in the image area. A threshold value is assigned to each individual cell within the threshold matrix. A transition matrix is defined having a same number of rows as the threshold matrix and a greater number of columns than the threshold matrix. The greater number of columns is equal to the product of an integer multiplier with the number of columns of the threshold matrix. The integer multiplier is dependent upon the minimum step distance. A threshold value is assigned to each individual cell within the transition matrix. Each column of the transition matrix has cells with threshold values which correspond to one of the columns of the threshold matrix, and is disposed adjacent to at least one other column with cells of identically assigned threshold values. The print medium is printed on with the at least one color ink, dependent upon the color value of the at least one color ink and the threshold values of the transition matrix.

An advantage of the present invention is that the transverse pixel resolution in a multicolor ink jet printer may be enhanced without affect and/or brightness.

Another advantage is that the method of printing of the present invention may be used with other print quality enhancement techniques which enhance the resolution of the print image along the horizontal axis.

BRIEF DESCRIPTION OF THE DRAWINGS

Other advantages and features of the invention may be realized by reference to the drawings and detailed description of the invention that follows.

FIGS. 3, 4 and 5 illustrate one method of defining a transition matrix by duplicating the threshold matrix of FIG. 2 in the transverse direction and thereby altering the pixel resolution in the transverse direction; and FIGS. 6, 7 and 8 illustrate an embodiment of the method of the present invention of defining a transition matrix by expanding the threshold matrix of FIG. 2 in the transverse direction and thereby enhancing the pixel resolution in the transverse direction.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
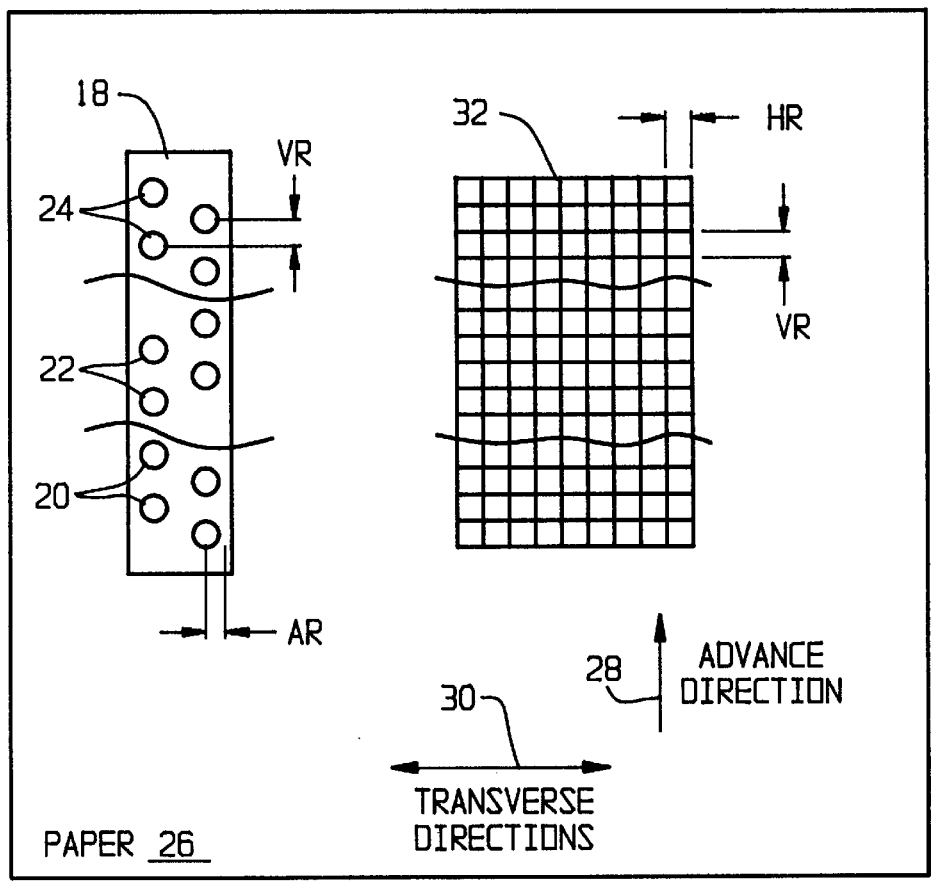
FIG. 1 is a schematic illustration of a printhead which may be used with the method of the present invention, and a portion of an image area in relation to the printhead.

Referring now to the drawings, and more particularly to FIG. 1, there is shown a schematic illustration of a tri-color printhead 18 which may be used with the method of the present invention. Printhead 18 includes a plurality of cyan ink emitting orifices 20, magenta ink emitting orifices 22, and yellow ink emitting orifices 24, with each array of orifices corresponding to a different color ink to be jetted onto the print medium, such as paper 26. Printhead 18 is shown in fragmentary form in FIG. 1 for simplicity sake with only four ink emitting orifices 20, 22 and 24 for each respective color ink. However, each array of ink emitting orifices actually likely includes more than four ink emitting orifices. A plurality of ink jetting heaters (not shown) which are associated with respective ink emitting orifices 20, 22 and 24 are selectively actuated to jet the ink from ink emitting orifices 20, 22 and 24. Printhead 18 is mounted on and carried by a movable carriage assembly (not shown). Paper 26 is movable in an advance direction 28 within the printer, and the carriage assembly is movable in a transverse direction 30 relative to advance direction 28. An image area 32 is defined which overlies paper 26. Image area 32 includes a plurality of rows and columns of pixel locations. Each separate pixel location corresponds to an ink dot placement location on the print medium.

Image area 32 has a vertical or advance resolution VR corresponding to the center-to-center spacing between ink emitting orifices 20, 22 and 24. In the embodiment shown, the advance resolution VR corresponds to a 300 dpi resolution. Image area 32 also has a horizontal or transverse resolution HR which is dependent upon frequency response limitations associated with the printhead, as described above. In the embodiment shown, image area 32 has a transverse resolution HR of approximately 300 dpi. Printhead 18 has an addressable resolution AR in the transverse direction 30 which is less than the transverse resolution HR of image area 32. The addressable resolution AR of printhead 18 is equal to or less than the minimum stepping distance of printhead 18 across paper 26 in transverse directions 30. In the embodiment shown, the addressable resolution AR in the horizontal direction is 600 dpi.

Figure 2:
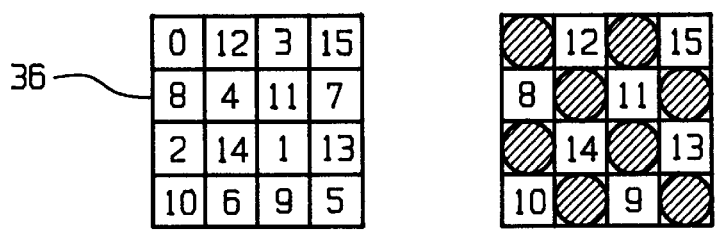
FIG. 2 is an example of a threshold matrix used during a halftoning printing process with a multi-color printhead.

Referring now to FIGS. 3–5, there is shown one method of defining a transition matrix 34 by duplicating the threshold matrix 36 of FIG. 2 in the transverse direction 30 and thereby altering the pixel resolution in the transverse direction 30. The method shown in FIGS. 3–5 is assumed to be carried out using tri-color printhead 18 including cyan ink emitting orifices 20, magenta ink emitting orifices 22 and yellow ink emitting orifices 24. Transition matrix 34 (FIG. 3) is defined which includes twice the number of columns as threshold matrix 36, but the same number of rows as threshold matrix 36. In the embodiment shown, transition matrix 34 has an advance pixel to resolution of 300 dpi and a transverse pixel resolution of 600 dpi. The transverse pixel resolution of 600 dpi corresponds to the maximum addressable resolution of printhead 18 (e.g., the minimum step distance of the stepper motor which moves the printhead). As shown, the four columns on the left of transition matrix 34 include sixteen cells which are identical to the sixteen cells shown in threshold matrix 36. Likewise, the four columns on the right of transition matrix 34 include sixteen cells which are identical to the cells of threshold matrix 36. Transition matrix 34 thus includes two arrays which are disposed adjacent to and identical to each other.

FIG. 4 illustrates the different color image planes corresponding to the transition matrix 34 shown in FIG. 3 for the three primary colors of the tri-color printhead. The four columns on the left side of each matrix are identical to the four columns on the right side of each matrix for each respective color. For the cyan image plane, all cells within the transition matrix 34 having a value of less than 8 correspond to locations at which ink dots can theoretically be placed, disregarding frequency response limitations of printhead 18. Likewise, the arrays for the magenta image plane and yellow image plane also include theoretical ink dot placement locations at which ink dots could be placed if the threshold value assigned to each individual cell is less than the assigned color value for the magenta and yellow inks. In the example shown, magenta is assigned a color value of 4 and yellow is assigned a color value of 12, indicating that approximately 25% of the magenta ink dots ($4/16=25\%$) and approximately 75% of the yellow dots ($12/16=75\%$) should be placed within the respective image planes.

FIG. 5 illustrates the different color print planes with actual ink dot placement locations associated with the data dots shown in FIG. 4, based upon the actual transverse resolution HR of the printhead. The ink dots are thus shown as generally filling a 300 dpi×300 dpi cell. The center of each ink dot placement location is based upon a leading edge of one or more ink dots shown in FIG. 4. Thus, where a single ink dot is shown in FIG. 4 with an empty cell to the right thereof, the corresponding ink dot placement location in FIG. 5 covers both the filled cell and the non-filled cell to the right.

It is apparent upon observing the ink dot placement locations in FIG. 4 that the above-described method of producing a transition matrix 34 with an altered horizontal resolution is not effective to place the various color inks onto the print medium such that physical characteristics such as color, hue, brightness, etc., are retained. For example, the original threshold matrix 36 includes sixteen cells and cyan is assigned a color value of 8 in the above example. Thus, approximately ½ the ink dot placement locations should correspond to cyan ink to retain the desired color properties. However, upon reviewing the array in FIG. 5 labeled cyan print plane, it will be noted that fourteen out of sixteen cells are filled, corresponding to fourteen ink dot placement locations on the image area. The approximate percentage of cyan ink coverage to the image area is thus $15/16$ or approximately 94% coverage by cyan ink. It is thus apparent that the color and hue properties using such a halftoning process may be substantially different since approximately 38% more than desired of the image area corresponding to the threshold matrix 36 is covered by cyan ink. Similarly, it is noted that the percentages of ink dot placement locations within the magenta image plane and yellow image plane are also substantially different than desired for magenta and yellow ink.

Referring now to FIGS. 6, 7 and 8, there is shown an illustration of an embodiment of the method of the present invention of defining a transition matrix 38 by expanding the threshold matrix 36 of FIG. 2 in the transverse direction and thereby enhancing the pixel resolution in the transverse direction 30, without deleteriously affecting the color, hue, brightness, etc., of the print image.

FIG. 6 illustrates a transition matrix 38 having four rows and eight columns. The four rows correspond to an advance pixel resolution of 300 dpi and the eight columns correspond to a transverse pixel resolution of 600 dpi, as indicated above. Rather than including two adjacent arrays of four columns each which are identical to threshold matrix 36 shown in FIG. 2, transition matrix 38 includes columns which have been duplicated and are identical to at least one horizontally adjacent column. For example, the two columns on the left side of transition matrix 38 correspond to the single column on the left side of threshold matrix 36; and the two columns on the right side of transition matrix 38 correspond to the single column on the right side of threshold matrix 36.

The number of columns of transition matrix 38 corresponds to a product of an integer multiplier with the number of columns of threshold matrix 36. The integer multiplier may be dependent upon the minimum addressable resolution of the printhead in the transverse direction. More particularly, the integer multiplier may be dependent upon the minimum step distance of a stepper motor used to drive the carriage assembly which carries printhead 18. In the embodiment shown, threshold matrix 36 has a transverse pixel resolution of 300 dpi based upon frequency response limitations of the printhead, and transition matrix 38 has a transverse resolution of 600 dpi corresponding to the addressable resolution of the printhead in the transverse direction. The integer multiplier therefore cannot exceed a value of 2 (600 dpi/300 dpi =2). If the addressable resolution of the printhead was greater than 600 dpi, the number of horizontally adjacent columns could likewise be increased. For example, if the addressable pixel resolution of the printhead in the horizontal direction was 1200 dpi, the transition matrix could include four times the number of columns when compared with the original threshold matrix. Configured as such, there would be four groups of four horizontally adjacent columns, with each group having columns with identical threshold values therein. With a 1200 dpi addressable resolution AR and transverse resolution HR of 300 dpi, the integer multiplier therefore cannot exceed a value of 4 (1200 dpi/300 dpi =4).

Referring to FIG. 7, ink dot placement locations for transition matrix 38 are shown. Since each column is disposed adjacent to an identical column, the dots are grouped in even numbers along a horizontal axis extending across each image plane. For example, referring to the cyan image plane, second row from the top, two pairs of ink dots are disposed to the left of the row and one pair of ink dots are disposed to the right of the row. Since each column is disposed horizontally adjacent to an identical column, an even number of pairs always occurs along the horizontal axis of each row, thereby eliminating a possibility of an odd number of horizontally adjacent ink dots.

FIG. 8 illustrates the actual placement pattern of the ink dots for each color ink when using transition matrix 38. The center of each ink dot placement location corresponds to the center of each pair of dots from horizontally adjacent columns which are shown in FIG. 7. There is a direct correspondence between the number of pairs of dots shown in FIG. 7 and the number of ink dot placement locations shown in FIG. 8. The number of ink dot placement locations shown in FIG. 8 is substantially different from the number and location of the ink dot placement locations for each color print plane shown in FIG. 5. For the cyan print plane shown in FIG. 8, there are eight ink dot placement locations. This is the desired eight out of sixteen ink dot placement locations for cyan ink, when compared with the fifteen ink dot placement locations for the cyan print plane shown in FIG. 5. Moreover, there are four ink dot placement locations for the magenta print plane shown in FIG. 8. Again, this is the desired four out of sixteen ink dot placement locations for magenta ink, when compared with the eight ink dot placement locations for the magenta print plane shown in FIG. 5. The method of the present invention for creating a transition matrix by expanding the threshold matrix in the transverse direction is therefore much more effective in retaining the desired proportions of the different color inks in the print image, when compared with the method of creating a transition matrix shown in FIGS. 3–5.

Using the transition matrix 38 shown in FIG. 6, ink is jetted from selected ink emitting orifices 20, 22 and 24 onto the print medium at select pixel locations of the image area if the color value of the cyan, magenta and yellow ink is less than the threshold value of a corresponding cell of transition matrix 38.

Although the present invention has been described with reference to preferred embodiments, those skilled in the art will recognize that changes may be made in form and detail without departing from the spirit and scope of the following claims.

I claim:

1. A method of printing an image on a print medium with at least one color ink using an ink jet printer, the print medium being movable in an advance direction in the ink jet printer, said method comprising the steps of:

providing a printhead having a plurality of ink emitting orifices for jetting ink onto the print medium, said ink emitting orifices being spaced apart in the advance direction a common distance, said printhead being movable in a direction transverse to the advance direction in incremental steps, said incremental steps having a step distance;

defining an image area having a plurality of rows of pixel locations and a plurality of columns of pixel locations, said pixel locations corresponding to ink dot placement locations on the print medium, said columns of pixel locations having an advance pixel resolution which is dependent upon said common distance, said rows of pixel locations having a transverse pixel resolution which is dependent upon said step distance;

assigning a color value to the at least one color ink;

defining a threshold matrix having a plurality of rows of cells and a plurality of columns of cells, each said cell corresponding to one of said pixel locations in said image area;

assigning a threshold value to each individual said cell within said threshold matrix;

defining a transition matrix having a same number of rows as said threshold matrix and a greater number of columns than said threshold matrix, said greater number of columns being a product of an integer multiplier with said number of columns of said threshold matrix, said integer multiplier being dependent upon said step distance;

assigning a threshold value to each individual said cell within said transition matrix, each said column of said transition matrix having cells with threshold values which correspond to one of said columns of said threshold matrix, each said column of said transition matrix disposed adjacent to at least one other said column with cells of identically assigned threshold values; and printing on the print medium with the at least one color ink, dependent upon said color value of the at least one color ink and said threshold values of said transition matrix.

2. The method of claim 1, wherein said advance pixel resolution and said transverse pixel resolution correspond to a resolution of approximately 300 dots per inch and said step distance corresponds to a resolution of approximately 600 dots per inch.

3. The method of claim 2, wherein said integer multiplier is equal to 2.

4. The method of claim 3, wherein said threshold matrix is a 4×4 matrix and said transition matrix is a 4×8 matrix.

5. The method of claim 1, wherein said at least one color ink comprises at least three color inks.

6. The method of claim 5, wherein said at least three color inks include yellow ink, magenta ink and cyan ink.

7. The method of claim 1, wherein said printing step comprises jetting ink from a selected one of said ink emitting orifices onto the print medium at a selected pixel location of the image area if the color value of the at least one color ink is greater than said threshold value of a corresponding said cell of said transition matrix.

8. The method of claim 1, wherein said printing step comprises jetting ink from a selected one of said ink emitting orifices onto the print medium at a selected pixel location within one of said plurality of rows of said pixel locations at a position where said adjacent cells of identically assigned threshold values of said transition matrix are juxtaposed.

9. The method of claim 1, wherein said threshold values of said transition matrix are independent from said color value of the at least one color ink.

* * * * *